(12) United States Patent
Morita et al.

(10) Patent No.: US 9,731,624 B2
(45) Date of Patent: Aug. 15, 2017

(54) ELECTRIC DRIVING WHEEL TYPE WORK VEHICLE

(71) Applicant: HITACHI CONSTRUCTION MACHINERY CO., LTD., Tokyo (JP)

(72) Inventors: Yuichiro Morita, Hitachi (JP);
Shigeyuki Yoshihara, Hitachinaka (JP);
Kazuo Ishida, Ryugasaki (JP);
Noritaka Ito, Ushiku (JP); Hirofumi Shimada, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 15/265,934

(22) Filed: Sep. 15, 2016

(65) Prior Publication Data
US 2017/0001539 A1 Jan. 5, 2017

Related U.S. Application Data

(63) Continuation of application No. 14/425,328, filed as application No. PCT/JP2013/074119 on Sep. 6, 2013, now Pat. No. 9,457,688.

(30) Foreign Application Priority Data

Sep. 27, 2012 (JP) ................. 2012-214077

(51) Int. Cl.
*H02P 23/00* (2016.01)
*B60L 15/08* (2006.01)
(Continued)

(52) U.S. Cl.
CPC ............ *B60L 15/08* (2013.01); *B60L 3/0023* (2013.01); *B60L 3/0084* (2013.01); *B60L 3/04* (2013.01);
(Continued)

(58) Field of Classification Search
CPC .......... B60L 15/08; B60L 3/0023; B60L 3/04; B60L 3/0084; H02P 27/08; H02P 6/085;
(Continued)

(56) References Cited

U.S. PATENT DOCUMENTS 5,615,933 A * 4/1997 Kidston .................. B60L 3/102
180/65.1
6,631,960 B2 * 10/2003 Grand ....................... B60T 1/10
303/152

(Continued)

FOREIGN PATENT DOCUMENTS

EP      2 626 474 A1    8/2013
JP      6-169502 A    6/1994
(Continued)

OTHER PUBLICATIONS

Extended European Search Report received in corresponding European Application No. 13842175.5 dated Apr. 15, 2016.
(Continued)

*Primary Examiner* — Rina Duda
(74) *Attorney, Agent, or Firm* — Mattingly & Malur, PC

(57) ABSTRACT

An electric driving wheel type work vehicle has a traveling motor, an inverter for supplying the motor with three-phase power converted from DC power, a pre-driver circuit for supplying a gate signal to the inverter on the basis of an input PWM signal, a controller for outputting to the pre-driver circuit the PWM signal for controlling the driving of the motor, a parking brake, and a parking brake condition detector that detects the condition of the parking brake. When it is detected that the parking brake has been operated, the pre-driver circuit cuts off the output of the gate signal or the input of the PWM signal to the pre-driver circuit.

2 Claims, 5 Drawing Sheets

(51) Int. Cl.
*B60T 7/02* (2006.01)
*B60T 7/12* (2006.01)
*B60T 8/88* (2006.01)
*B60L 3/00* (2006.01)
*B60L 3/04* (2006.01)
*B60L 11/00* (2006.01)
*B60L 11/08* (2006.01)
*E02F 9/20* (2006.01)
*B60L 15/20* (2006.01)
*H02P 27/08* (2006.01)

(52) U.S. Cl.
CPC .............. *B60L 11/005* (2013.01); *B60L 11/08* (2013.01); *B60L 15/2009* (2013.01); *B60T 7/02* (2013.01); *B60T 7/12* (2013.01); *B60T 8/885* (2013.01); *E02F 9/207* (2013.01); *H02P 27/08* (2013.01); *B60L 2210/40* (2013.01); *B60L 2240/30* (2013.01); *Y02T 10/70* (2013.01); *Y02T 10/7022* (2013.01); *Y02T 10/7077* (2013.01); *Y02T 10/7241* (2013.01); *Y02T 10/7258* (2013.01); *Y10S 903/906* (2013.01)

(58) Field of Classification Search
CPC ........... H02P 23/0077; H02M 7/53873; H02M 7/53875
USPC .................... 318/727, 798, 801, 599, 811
See application file for complete search history.

(56) References Cited

U.S. PATENT DOCUMENTS

| | | | | |
|---|---|---|---|---|
| 7,052,093 B2 * | 5/2006 | Suzuki | ................. | B60T 13/741 188/162 |
| 2004/0026989 A1 * | 2/2004 | Suzuki | ................... | B60T 17/16 303/89 |
| 2005/0258681 A1 * | 11/2005 | Fulks | ................... | B60T 13/741 303/3 |
| 2008/0236963 A1 * | 10/2008 | Yasukawa | ............. | B60T 13/741 188/156 |
| 2013/0060412 A1 * | 3/2013 | Nakagawara | ........... | B60T 1/005 701/22 |

FOREIGN PATENT DOCUMENTS

| | | |
|---|---|---|
| JP | 6-276612 A | 9/1994 |
| JP | 8-198067 A | 8/1996 |
| JP | 11-178118 A | 7/1999 |
| WO | 2012/046677 A1 | 4/2012 |

OTHER PUBLICATIONS

International Preliminary Report on Patentability received in corresponding International Application No. PCT/JP2013/074110 dated Apr. 9, 2015.

* cited by examiner

ELECTRIC DRIVING WHEEL TYPE WORK VEHICLE

CROSS-REFERENCE TO RELATED APPLICATION

This application is a continuation application of U.S. application Ser. No. 14/425,328, filed Mar. 3, 2015, the entirety of the contents and subject matter of all of the above is incorporated herein by reference.

TECHNICAL FIELD

The present invention relates to a work machine that uses wheel type traveling means, such as a wheel loader operating not only on flatlands but also often on slop lands in a manner involving frequent start and stop during work. More particularly, the invention relates to an electric driving wheel type work vehicle that is driven by a motor while traveling.

BACKGROUND ART

The standard wheel loaders are equipped with an engine as its driving source and has engine power transmitted to the wheels via a torque converter or a gear transmission. In response to operators' manipulation of the forward/reverse lever, the wheel loader allows the gear transmission to be shifted to forward (F), to neutral (N), or to reverse (R). The wheel loaders are also furnished with a parking brake device. Activating the parking brake causes the wheel loaders to put the gear transmission in the neutral (N) position to cut off power transmission to the wheels. This operation prevents the parking brake from dragging and inhibits the wheel loader from getting started inadvertently.

By contrast, electric driving wheel loaders have their wheels driven by the motor. Since the motor itself can be changed in its driving direction and possesses a variable speed function, some vehicles of this type are not equipped with the gear transmission. That means there is a need for some other methods for cutting off power transmission to the wheels while the parking brake is being activated. A first known method, for example, involves an electric vehicle parking brake device having a parking brake lever that is equipped with a switch for causing a motor controller to detect the operating status of the parking brake on the vehicle, the switch controlling the output of power conversion means in the motor controller (e.g., see Patent Literature 1). A second known method involves an electric vehicle parking brake device having a lock detection device that detects the condition of engagement between the locking teeth of a parking gear attached to the motor output shaft; and the pawls of a locking member, the lock detection device having a controller detecting the operating status of the parking brake of the vehicle and operating a relay switch accordingly to disconnect a power supply circuit of the motor (e.g., see Patent Literature 2).

PRIOR ART LITERATURE

Patent Literature

Patent Literature 1: JP-1994-169502-A
Patent Literature 2: JP-1996-198067-A

SUMMARY OF THE INVENTION

Problem to be Solved by the Invention

The devices described in the above-cited Patent Literature 1 and 2 both get the controller to detect the condition of the parking brake to control activation and deactivation of the motor accordingly, and to control motor drive in accordance with the condition of the accelerator pedal. In a case where the controller malfunctions, it might not be possible to cut off power transmission to the wheels even if the parking brake is activated. This requires providing measures for improving reliability, such as installation of a redundant controller arrangement.

An object of the present invention is to provide an electric driving wheel type work vehicle which, even if the controller malfunctions, can cut off power transmission to the wheels when the parking brake is activated.

Means for Solving the Problem (1) In achieving the above object and according to the present invention, there is provided an electric driving wheel type work vehicle having a traveling motor, an inverter for driving the motor, a pre-driver circuit for supplying a gate signal to the inverter on the basis of an input signal, a controller for outputting to the pre-driver circuit the signal for controlling the driving of the motor, and parking brake means. The work vehicle includes parking brake condition detection means that detects a condition of the parking brake means. When the parking brake condition detection means detects that the parking brake means has been operated, the pre-driver circuit cuts off an output of the gate signal.

In a case where the controller malfunctions, the above structure would allow power transmission to the wheels to be cut off when the parking brake is activated.

(2) Preferably, in the electric driving wheel type work vehicle stated in paragraph (1) above, the pre-driver circuit should be configured to cut off the output of the gate signal regardless of the signal output from the controller to the pre-driver circuit.

(3) Preferably, the electric driving wheel type work vehicle stated in paragraph (1) above should further include a distribution circuit that outputs a first parking brake condition signal in accordance with the parking brake condition that has been output from the parking brake condition detection means, the distribution circuit further outputting a second parking brake condition signal having a predetermined delay time relative to the first parking brake condition signal. On the basis of the second parking brake condition signal, the pre-driver circuit should preferably cut off the output of the gate signal, or the input of a PWM signal to the pre-driver circuit should be cut off.

(4) Preferably, in the electric driving wheel type work vehicle stated in paragraph (3) above, the pre-driver circuit should include gate signal generation means that outputs the gate signal for controlling, on the basis of the input PWM signal, up-down arm switching elements constituting the inverter. The gate signal generation means may include an inhibit terminal that stops the output of the gate signal. When the second parking brake condition signal is input to the inhibit terminal and the parking brake condition detection means detects the parking brake means has been operated, the pre-driver circuit should preferably cut off the output of the gate signal.

(5) Preferably, the electric driving wheel type work vehicle stated in paragraph (3) above should further include a gate circuit interposed between the controller and the pre-driver circuit, the gate circuit cutting off the input of the PWM signal to the pre-driver circuit. When the second parking brake condition signal is input to the inhibit terminal and the parking brake condition detection means detects the parking brake means has been operated, the gate circuit should preferably cut off the input of the PWM signal to the pre-driver circuit.

(6) Preferably, in the electric driving wheel type work vehicle stated in paragraph (3) above, the controller should include PWM signal generation means that outputs the PWM signal, and a gate circuit interposed between the PWM signal generation means and the pre-driver circuit, the gate circuit cutting off the input of the PWM signal to the pre-driver circuit. When the second parking brake condition signal is input to the gate circuit and the parking brake condition detection means detects the parking brake means has been operated, the gate circuit should preferably cut off the input of the PWM signal to the pre-driver circuit.

(7) Preferably, in the electric driving wheel type work vehicle stated in paragraph (1) above, the pre-driver circuit may include gate signal generation means that outputs the gate signal for controlling, on the basis of the input PWM signal, up-down arm switching elements constituting the inverter. The gate signal generation means should include an inhibit terminal that stops the output of the gate signal. When a parking brake condition signal output from the parking brake condition detection means is input to the inhibit terminal and the parking brake condition detection means detects the parking brake means has been operated, the pre-driver circuit should preferably cut off the output of the gate signal.

(8) Preferably, the electric driving wheel type work vehicle stated in paragraph (1) above should further include a gate circuit interposed between the controller and the pre-driver circuit, the gate circuit cutting off the input of the PWM signal to the pre-driver circuit. When a parking brake condition signal output from the parking brake condition detection means is input to the gate circuit and the parking brake condition detection means detects the parking brake means has been operated, the gate circuit should preferably cut off the input of the PWM signal to the pre-driver circuit.

(9) Preferably, in the electric driving wheel type work vehicle stated in paragraph (1) above, the controller may include PWM signal generation means that outputs the PWM signal, and a gate circuit interposed between the PWM signal generation means and the pre-driver circuit, the gate circuit cutting off the input of the PWM signal to the pre-driver circuit. When a parking brake condition signal output from the parking brake condition detection means is input to the gate circuit and the parking brake condition detection means detects the parking brake means has been operated, the gate circuit should preferably cut off the input of the PWM signal to the pre-driver circuit.

Advantageous Effect of the Invention

According to the present invention, even if the controller malfunctions, it is still possible to cut off power transmission to the wheels when the parking brake is activated.

MODE FOR CARRYING OUT THE INVENTION

Explained below with reference to FIGS. 1 to 5 are the structure and the workings of the electric driving wheel type work vehicle according to the first embodiment of the present invention. As an example of the electric driving wheel type work vehicle, an electric driving wheel loader will be explained. The traveling drive system of this vehicle is a so-called electric hybrid system.

First of all, an overall configuration of the electric driving wheel type work vehicle according to the first embodiment will be explained with reference to FIG. 1.

Figure 1:
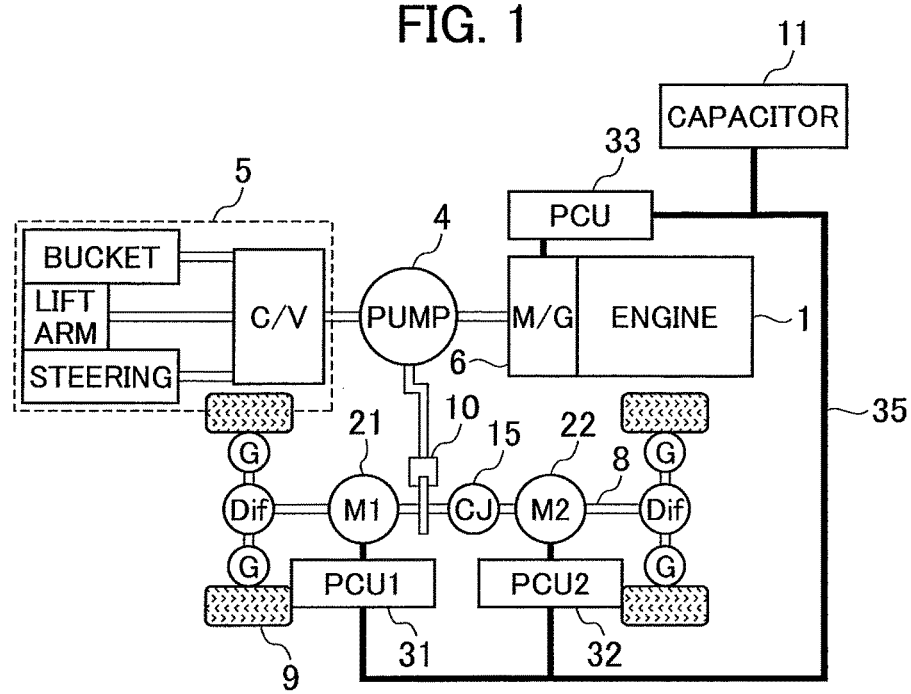
FIG. 1 is a system configuration diagram showing an overall configuration of an electric driving wheel type work vehicle according to a first embodiment of the present invention.

FIG. 1 is a system configuration diagram showing the overall configuration of the electric driving wheel type work vehicle according to the first embodiment of the present invention.

The traveling drive system of this vehicle includes: an engine 1; a power assist motor (M/G) 6; a power control unit (PCU) 33 that performs power conversion of the M/G 6; a low-speed high-torque traveling motor (M1) 21 and a high-speed low-torque traveling motor (M2) 22 that drive wheels 9 via a drive shaft 8 and a center joint (CJ) 15; power control units (PCU) 31 and 32 that respectively perform power conversion of the traveling motors 21 and 22; a capacitor 11 serving as a secondary battery constituting an electrical storage unit that stores the power generated by the M/G 6 as well as the power regenerated by the traveling motors 21 and 22; and a bus (BUS) 35 for transferring power between the PCUs 31, 32 and 33 and the capacitor 11.

The power generated by the M/G 6 rotated by the power of the engine 1 and the power regenerated by the traveling motors 21 and 22 at a time of braking during traveling are stored into the capacitor 11. The power from the capacitor 11 is used by an electric power converter (inverter) 313 to drive the traveling motors 21 and 22. Whereas the first embodiment uses two traveling motors of different characteristics, there may be provided only one traveling motor instead. Another alternative may be that each of the wheels is equipped with a traveling motor. The capacitor adopted by the first embodiment to be explained below may be replaced with a suitable battery serving as a secondary battery.

This system is furnished with a spring-activated parking brake 10. Turning off a parking brake switch (parking brake condition detection means)(parking brake switch 12 in FIG. 2) deactivates the parking brake by getting a hydraulic pump 4 to supply a hydraulic pressure surpassing spring force. Turning on the parking brake switch activates the parking brake by cutting off the hydraulic pressure from the hydraulic pump 4.

An implement 5 of this system (front structure of the wheel loader) is driven by the hydraulic pressure from the hydraulic pump 4 rotated by the engine 1. The implement 5 includes a bucket, a lift arm, and steering. The hydraulic pressure supplied from the hydraulic pump 4 is controlled by a control valve (C/V) in a manner controlling the direction and the flow rate of hydraulic fluid fed to a bucket cylinder, a lift cylinder, and a steering cylinder. This in turn controls the direction and the speed of the bucket, lift arm, and steering.

Whereas the first embodiment has an electric hybrid traveling drive system, there may be provided alternatively an electric traveling drive system that runs on the power stored beforehand in the electrical storage unit or on the power generated by solar power.

Figure 2:
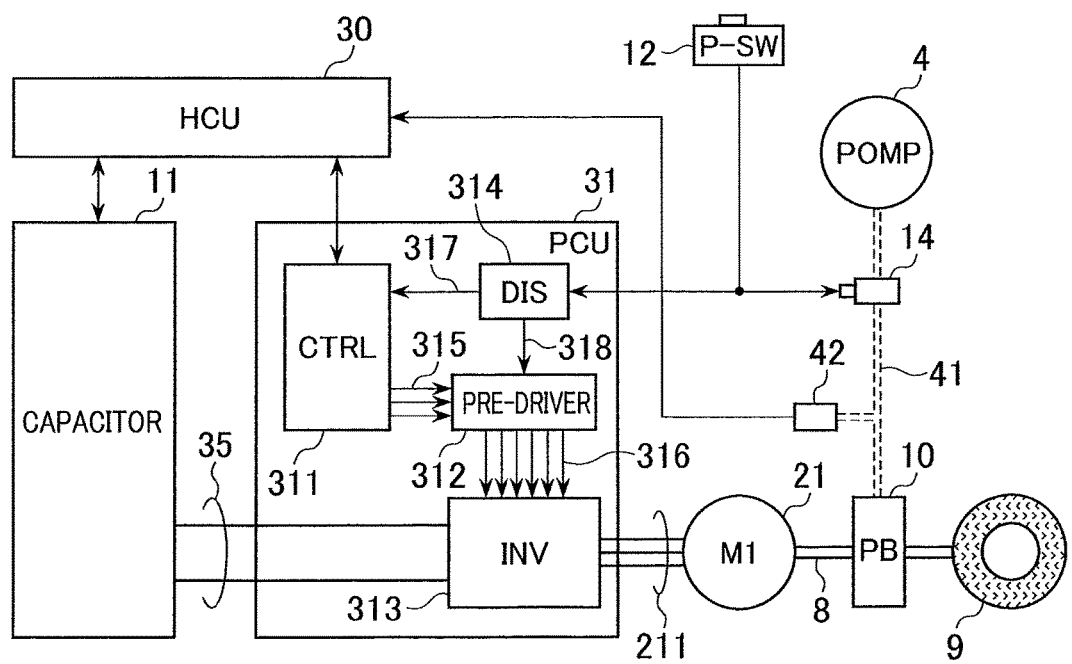
FIG. 2 is a system configuration diagram showing a structure of an electric drive control device used by the electric driving wheel type work vehicle according to the first embodiment of the present invention.
Figure 3:
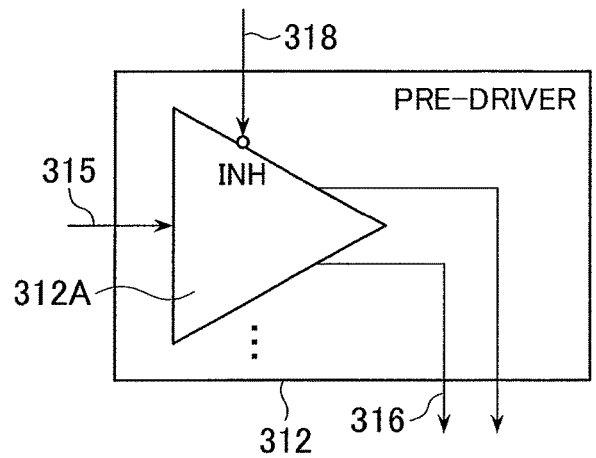
FIG. 3 is a block diagram showing a major structure of the electric drive control device used by the electric driving wheel type work vehicle according to the first embodiment of the present invention.

Explained next with reference to FIGS. 2 and 3 is the structure of the electric drive control device used by the electric driving wheel type work vehicle according to the first embodiment.

FIG. 2 is a system configuration diagram showing a structure of the electric drive control device used by the electric driving wheel type work vehicle according to the first embodiment of the invention. FIG. 3 is a block diagram showing a major structure of the electric drive control device used by the electric driving wheel type work vehicle according to the first embodiment of the invention.

As shown in FIG. 2, the parking brake switch 12 is located where the operator can manipulate it, such as on an operation panel. Turning on the parking brake switch 12 closes a solenoid valve 14 cutting off a parking brake deactivation hydraulic pressure 41 to activate the parking brake. Turning off the supply parking brake switch 12 opens the solenoid valve 41 supplying the parking brake deactivation hydraulic pressure 41 to deactivate the parking brake.

The power control unit (PCU) 31 includes a controller 311 that performs drive control of the traveling motor 21 on the basis of a torque command from a hybrid integrated controller (HCU) 30, an electric power converter (inverter) 313 that performs power conversion between the bus 35 and the traveling motor 21, and a pre-driver circuit 312 that generates a gate signal 316 to be input to the electric power converter 313. The pre-driver circuit 312 outputs three-phase up-down arm gate signals 316 to the electric power converter 313 on the basis of a three-phase PWM signal 315 output from the controller 311. The electric power converter 313 performs drive control of the traveling motors 21 and 22.

The PCU 31 further includes a distribution circuit 314 that distributes the signal of the parking brake switch 12 to the controller 311 and pre-driver circuit 312. The distribution circuit 314 outputs a parking brake condition "a" signal 317 to the controller 311 and a parking brake condition "b" signal 318 to the pre-driver circuit 312. At a time of input of the parking brake condition "a" signal 317 indicating that the parking brake switch 12 is turned on from the OFF state, the controller 311 stops the output of the PWM signal 315.

Also, at a time of input of the parking brake condition "b" signal 318 indicating that the parking brake switch 12 is turned on from the OFF state, the pre-driver circuit 312 stops the output of the gate signals 316.

An internal structure of the pre-driver circuit 312 will be explained below with reference to FIG. 3.

The pre-driver circuit 312 includes a gate signal generation IC 312A. The electric power converter 313 shown in FIG. 2 has switching elements therein for each of three phases of an up-down arm. That is, the electric power converter 313 is equipped with six switching elements for the three phases. Thus the pre-driver circuit 312 outputs six gate signals 316. Meanwhile, the pre-driver circuit 312 is fed with three PWM signals 315 from the controller 311. Thus the pre-driver circuit 312 is equipped with three gate signal generation IC's 312A, only one of which is shown in the drawing.

At a time of input of a single PWM signal 315, the gate signal generation IC 312A outputs two gate signals 312 on the basis of the input signal. A first gate signal 316 may be input to the gate terminal of a U-phase up-arm switching element in the electric power converter 313 for example, and a second gate signal 316 may be input to the gate terminal of a U-phase down-arm switching element in the electric power converter 313, for example.

The gate signal generation IC 312A is furnished with an inhibit terminal INH. The parking brake condition "b" signal 318 is input to the inhibit terminal INH. When the parking brake switch 12 is turned on from the OFF state, the parking brake condition "b" signal 318 is switched to the low level from the high level. When the signal level of the inhibit terminal INH is switched to the low level, the gate signal generation IC 312A stops the output of the gate signal 316.

As will be discussed later with reference to FIG. 5, when the parking brake switch 12 is turned on from the OFF state, a delay time Td is inserted into the parking brake condition "b" signal 318. The delay time Td is set to be longer than the time during which the controller 311 stops driving of the traveling motor 21.

The HCU 30 also measures the parking brake deactivation hydraulic pressure 41 by use of a pressure sensor 42, so as to detect activation and deactivation of the parking brake 10. Thus when the controller 311 notifies the HCU 30 of the condition of the parking brake condition "a" signal 317 allowing the HCU 30 to match the notification to the condition of the parking brake 10 obtained by the pressure sensor 42, it is possible to detect malfunction of the distribution circuit 314.

Figure 4:
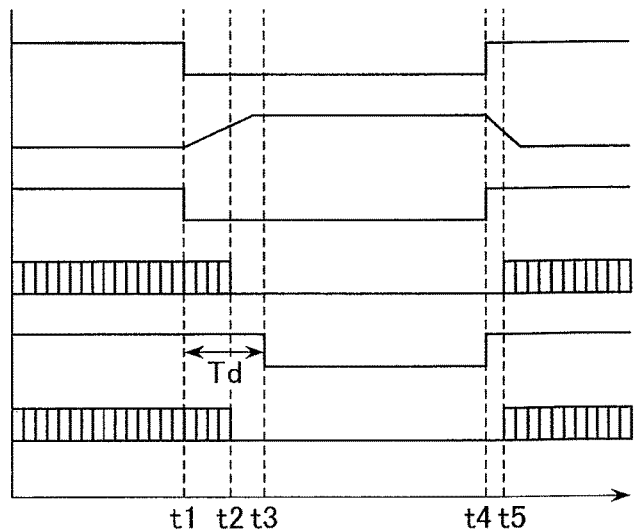
FIG. 4 is a timing chart showing the workings of the electric drive control device used by the electric driving wheel type work vehicle according to the first embodiment of the present invention.
Figure 5:
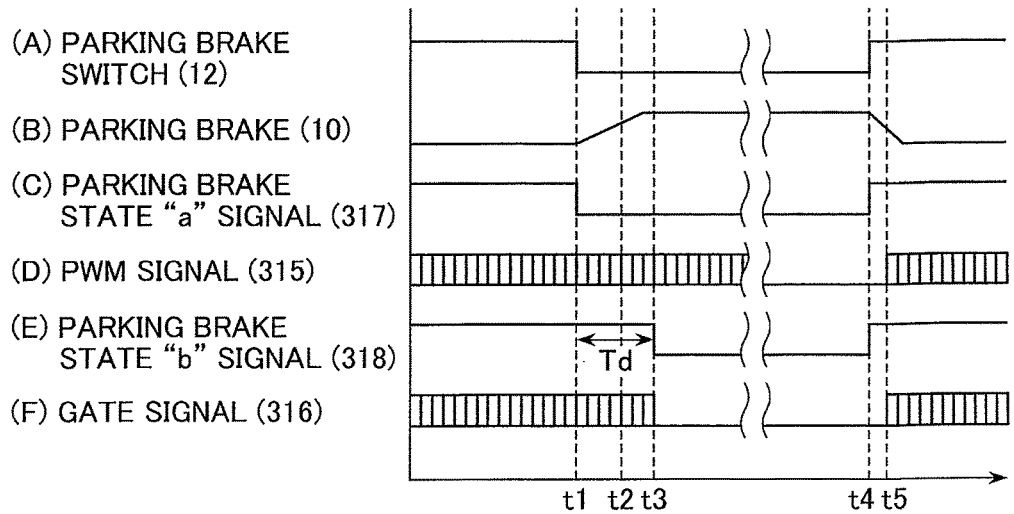
FIG. 5 is another timing chart showing the workings of the electric drive control device used by the electric driving wheel type work vehicle according to the first embodiment of the present invention.

Explained below with reference to FIGS. 4 and 5 is how the electric drive control device used by the electric driving wheel type work vehicle according to the first embodiment operates.

FIGS. 4 and 5 are timing charts showing the workings of the electric drive control device used by the electric driving wheel type work vehicle according to the first embodiment.

FIG. 4 shows the workings of the electric drive control device, in case that the parking brake is operated in the normal state. In FIG. 4, the horizontal axis denotes time. The vertical axis stands for the condition of the parking brake switch 12 in FIG. 4(A), for the condition of the parking brake 10 in FIG. 4(B), and for the condition of the parking brake condition "a" signal 317 in FIG. 4(C). The vertical axis stands for the PWM signal 315 in FIG. 4(D), for the condition of the parking brake condition "b" signal 318 in FIG. 4(E), and for the condition of the gate signal 316 in FIG. 4(F).

Once the parking brake switch 12 is turned on at time t1 as shown in FIG. 4(A), the parking brake 10 transitions from the deactivated state to the activated state as indicated in FIG. 4(B). Once the parking brake condition "a" signal 317 input via the distribution circuit 314 is turned on from the OFF state as shown in FIG. 4(C), the controller 311 in the PCU 31 starts controlling activation and deactivation of the traveling motor 21, and stops the output of the PWM signal 315 at time t2 as depicted in FIG. 4(D). This allows the pre-driver circuit 312 to stop the output of the gate signal 316 on the basis of activation and deactivation control of the controller 311 before the parking brake condition "b" signal 318 input via the distribution circuit 314 is turned on from the OFF state (at time t3) following the delay time Td.

Moreover, as shown in FIG. 4(A), once the parking brake switch 12 is turned off at time t4 as shown in FIG. 4(A), the parking brake 10 transitions from the activated state to the deactivated state as indicated in FIG. 4(B). Once the parking brake condition "a" signal 317 input via the distribution circuit 314 is turned off from the ON state as shown in FIG. 4(C), the controller 311 in the PCU 31 restarts drive control of the traveling motor 21 at time t5 and outputs the PWM signal 315 as depicted in FIG. 4(D). Once the parking brake condition "b" signal 318 input via the distribution circuit 314 is turned off from the ON state as shown in FIG. 4(E), the pre-driver circuit 312 can restart the output of the gate signal 316 at time t5 on the basis of drive control of the controller 311 as indicated in FIG. 4(F).

In the manner described above, the electric drive control device of the first embodiment can stop and restart traveling drive on the basis of the operations of the parking brake.

FIG. 5 shows the workings of the electric drive control device, in case that the parking brake is operated with the controller 311 in an abnormal state. The horizontal axis in FIG. 5 denotes time. The vertical axes in FIGS. 5(A) through 5(F) are the same as those in FIGS. 4 (A) through 4(F).

When the parking brake switch 12 is turned on at time t1 as shown in FIG. 5(A), the parking brake 10 transitions from the deactivated state to the activated state as indicated in FIG. 5(B). It is assumed here that, as shown in FIG. 5(C), even when the parking brake condition "a" signal 317 input via the distribution circuit 314 has been turned on from the OFF state, the controller 311 in the PCU 31 remains in the abnormal state where it is incapable of stopping drive control of the traveling motor 21.

In that case, as shown in FIG. 5(E), when the parking brake condition "b" signal 318 input via the distribution circuit 314 is turned on from the OFF state at time t3 following the delay time Td, the pre-driver circuit 312 is capable of stopping the output of the gate signal 316 on the basis of the parking brake condition "b" signal 318 even if the controller 311 keeps outputting the PWM signal, as indicated in FIG. 5(F).

Thereafter, with the controller 311 restarted by key operation, the act of turning off the parking brake switch 12 at time t4 causes the parking brake 10 to transition from the activated state to the deactivated state. When the parking brake condition "a" signal 317 input via the distribution circuit 314 is turned off from the ON state, the controller 311 in the PCU 31 restarts drive control of the traveling motor 21 and outputs the PWM signal 315 (at time t5). Because the parking brake condition "b" signal 318 input via the distribution circuit 314 is turned off from the ON state, the pre-driver circuit 312 can restart the output of the gate signal 316 on the basis of drive control of the controller 311.

In the manner described above, even in a case where the controller 311 is in the abnormal state, the electric drive control device of the first embodiment would be able to stop and restart traveling drive on the basis of the operations of the parking brake.

According to the method described in the above-cited Patent Literature 1, there is provided a relay switch that cuts off the power supply circuit for the motor. Since the power to be supplied to the traveling motor of the wheel loader is high, the relay switch needs to be of high capacity, which contributes to increasing cost. According to the first embodiment, by contrast, the gate signal to the motor driving circuit is cut off to discontinue power transmission to the wheels. This eliminates the need for the high-capacity relay switch designed to turn off the motor power supply circuit. With no need for such a switch, the cost of the electric driving wheel type work vehicle will be reduced.

Figure 6:
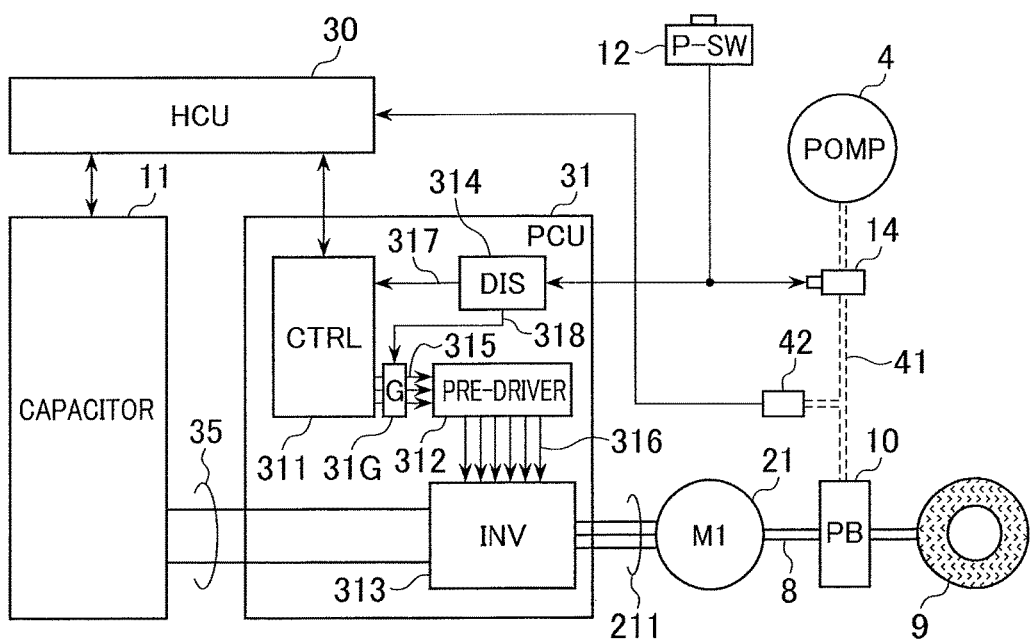
FIG. 6 is a system configuration diagram showing a structure of an electric drive control device used by an electric driving wheel type work vehicle according to a second embodiment of the present invention.

Explained next with reference to FIG. 6 is how the electric driving wheel type work vehicle according to the second embodiment of the invention is structured and how it operates. The overall configuration of the electric driving wheel type work vehicle according to the second embodiment is the same as that shown in FIG. 1.

FIG. 6 is a system configuration diagram showing a structure of an electric drive control device used by the electric driving wheel type work vehicle according to the second embodiment of the present invention. In FIG. 6, the same reference numerals as those used in FIG. 2 suggest the same or corresponding parts.

In addition to the configuration shown in FIG. 1, the second embodiment has a gate circuit 31G interposed between the controller 311 and the pre-driver circuit 312. The parking brake condition "b" signal 318 output from the distribution circuit 314 is input to the gate circuit 31G.

There are three PWM signals 315 to be input from the controller 311 to the gate circuit 31G. The gate circuit 31G may be furnished with three two-input AND gates, for example. One PWM signal 315 is fed to one of the two inputs of each AND gate, and the parking brake condition "b" signal 318 is fed to the other input of the AND gate. Thus when the parking brake condition "b" signal 318 transitions from the high level to the low level, the AND gate in question is turned off, which cuts off the input of the PWM signal 315 from the controller 311 to the pre-driver circuit 312.

In the second embodiment, as with the first embodiment, in a case where the parking brake is operated with the controller 311 in the abnormal state and where the parking brake condition "b" signal 318 input via the distribution circuit 314 is turned on from the OFF state following the delay time Td, the input of the PWM signal 315 to the pre-driver 312 would be cut off even if the controller 311 keeps outputting the PWM signal 315. In this manner, the output of the gate signal 316 would be stopped.

As described above, even in a case where the controller 311 is in the abnormal state, the electric drive control device of the second embodiment would still be able to stop and restart traveling drive on the basis of the parking brake operations.

Figure 7:
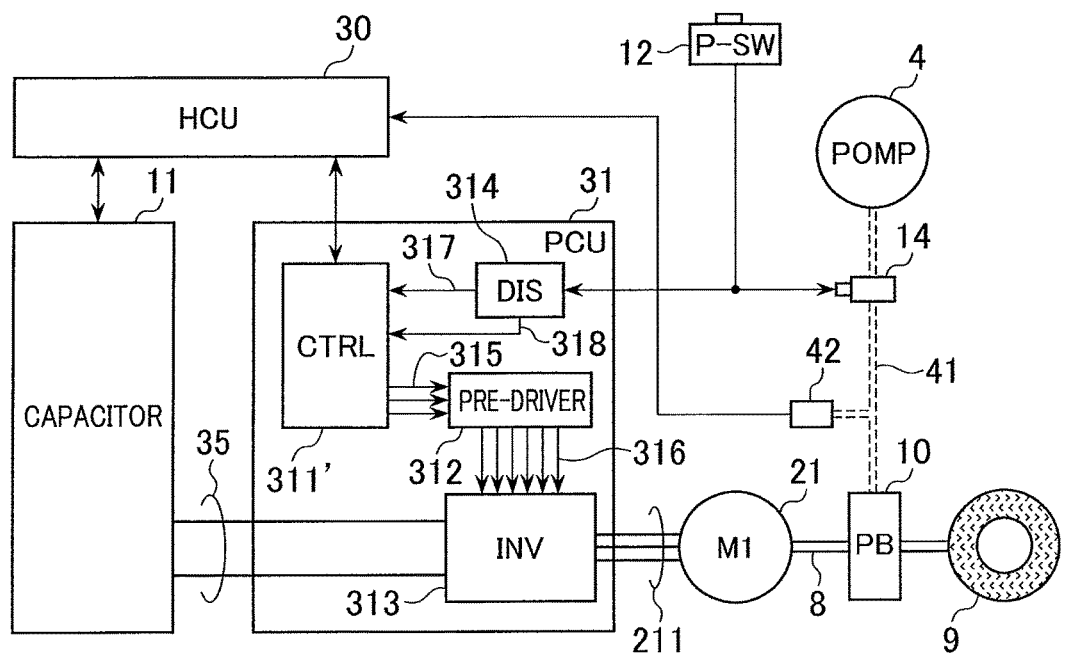
FIG. 7 is a system configuration diagram showing a structure of an electric drive control device used by an electric driving wheel type work vehicle according to a third embodiment of the present invention.
Figure 8:
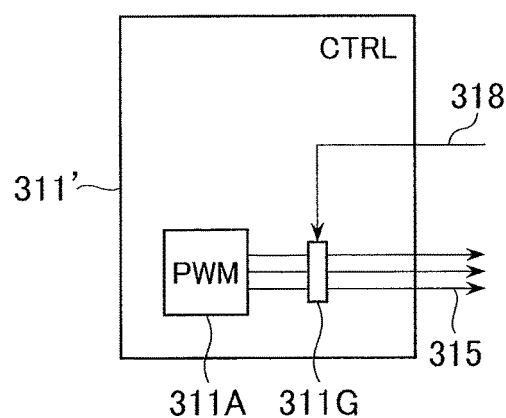
FIG. 8 is a block diagram showing a major structure of the electric drive control device used by the electric driving wheel type work vehicle according to the third embodiment of the present invention.

Explained next with reference to FIGS. 7 and 8 is how the electric driving wheel type work vehicle according to the third embodiment of the present invention is structured and how it operates. The overall configuration of the electric driving wheel type work vehicle according to the third embodiment is the same as that shown in FIG. 1. FIG. 7 is a system configuration diagram showing a structure of an electric drive control device used by the electric driving wheel type work vehicle according to the third embodiment of the present invention. In FIG. 7, the same reference numerals as those used in FIG. 2 designate the same or corresponding parts. FIG. 8 is a block diagram showing a major structure of the electric drive control device used by the electric driving wheel type work vehicle according to the third embodiment of the invention.

In the third embodiment, as shown in FIG. 7, the parking brake condition "b" signal 318 output from the distribution circuit 314 is input to a controller 311'.

An internal structure of the controller 311' will be explained next with reference to FIG. 8. The controller 311' includes a PWM signal generation circuit 311A that generates the PWM signal 315. The generated PWM signal 315 is input to the pre-driver circuit 312 shown in FIG. 7. Inside the controller 311', a gate circuit 311G is interposed between the PWM signal generation circuit 311A and the pre-driver circuit 312. The parking brake condition "b" signal 318 output from the distribution circuit 314 is input to the gate circuit 311G.

There are three PWM signals 315 to be input to the gate circuit 311G from the controller 311'. The gate circuit 311G may include three two-input AND gates, for example. One PWM signal 315 is fed to one of the inputs of each AND gate. The parking brake condition "b" signal 318 is fed to the other input of the AND gate. Thus when the parking brake condition "b" signal 318 transitions from the high-level to the low-level, the AND gate is turned off, which cuts off the input of the PWM signal 315 to the pre-driver 312 from the controller 311'.

In the third embodiment, as with the first embodiment, in a case where the parking brake is operated with the controller 311' in the abnormal state and where the parking brake condition "b" signal 318 input via the distribution circuit 314 is turned on from the OFF state following the delay time Td, the input of the PWM signal 315 to the pre-driver 312 would be cut off even if the controller 311' keeps outputting the PWM signal 315. In this manner, the output of the gate signal 316 would be stopped.

As described above, even in a case where the controller 311' is in the abnormal state, the electric drive control device of the third embodiment would still be able to stop and restart traveling drive on the basis of the parking brake operations.

Figure 9:
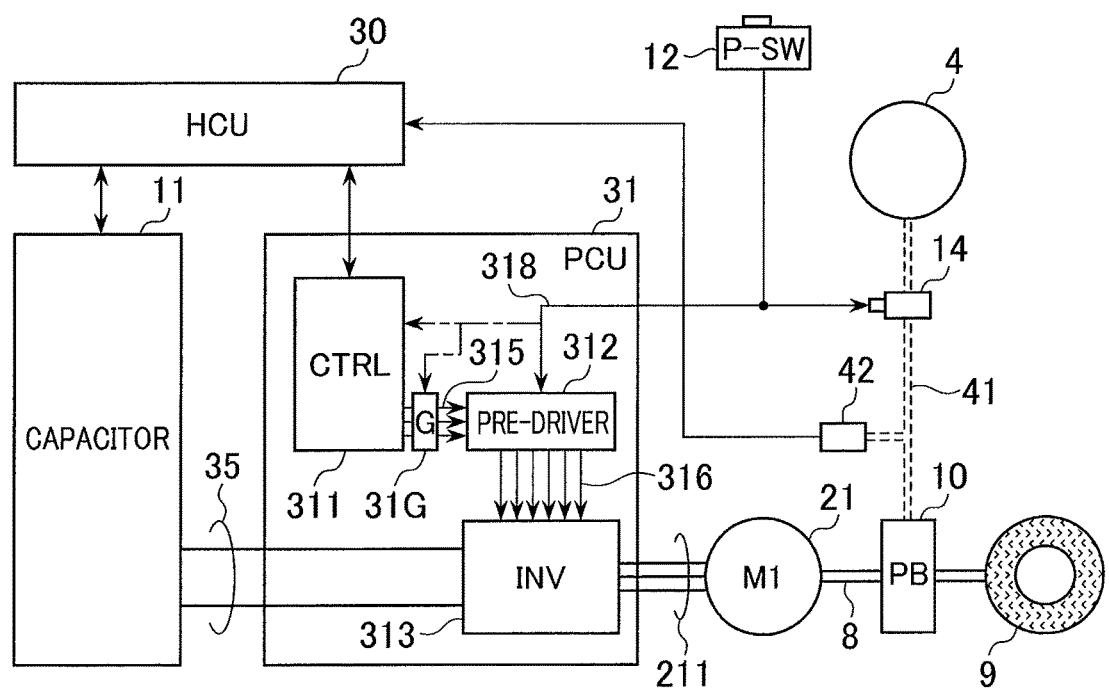
FIG. 9 is a system configuration diagram showing a structure of an electric drive control device used by an electric driving wheel type work vehicle according to a fourth embodiment of the present invention.

Explained next with reference to FIG. 9 is how the electric driving wheel type work vehicle according to the fourth embodiment of the present invention is structured and how it operates. The overall configuration of the electric driving wheel type work vehicle according to the fourth embodiment is the same as that shown in FIG. 1.

FIG. 9 is a system configuration diagram showing a structure of an electric drive control device used by the electric driving wheel type work vehicle according to the fourth embodiment of the present invention. In FIG. 9, the same reference numerals as those used in FIG. 2 designate the same or corresponding parts.

The fourth embodiment is characterized by the absence of the distribution circuit 314 shown in FIG. 2. The signal from the parking brake switch 12 is therefore input unchecked to the pre-driver circuit 312 as the parking brake condition "b" signal 318.

That is, in the fourth embodiment, upon input of the parking brake condition "b" signal 318 indicating that the parking brake switch 12 is turned on from the OFF state, the pre-driver circuit 312 stops the output of the gate signal 316. Meanwhile, without the distribution circuit 314 shown in FIG. 2, even if the parking brake switch 12 is turned on from the OFF state, the controller 311 will not stop the output of the PWM signal 315. Even in a case where the parking brake is operated with the controller 311 in the abnormal state, the pre-driver circuit 312 still would stop the output of the gate signal 316.

Alternatively, as in the embodiment shown in FIG. 6, there may be provided a gate circuit 31G indicated by a broken line. The parking brake condition "b" signal 318 indicated by a dashed line is input to the gate circuit 31G instead of to the pre-driver circuit 312. Also in the manner explained above with reference to FIG. 6, it is possible to cut off the input of the PWM signal 315 to the pre-driver circuit 312.

As in the embodiment shown in FIG. 7, the parking brake condition "b" signal 318 indicated by the dashed line can be input to the controller 311. The controller 311 includes the gate circuit 311G as shown in FIG. 8. Also in the manner explained above with reference to FIG. 8, it is possible to cut off the input of the PWM signal 315 to the pre-driver circuit 312.

In the fourth embodiment, as with the first embodiment, in a case where the parking brake is operated with the controller 311 in the abnormal state and where the parking brake condition "b" signal 318 input via the distribution circuit 314 is turned on from the OFF state, the output of the PWM signal 315 from the pre-driver 312 would be stopped even if the controller 311 keeps outputting the PWM signal 315.

As described above, even in a case where the controller 311 is in the abnormal state, the electric drive control device of the fourth embodiment would still be able to stop and restart traveling drive on the basis of the parking brake operations.

Although the embodiments were discussed above by use of examples in which the PWM signal 315 is continuously output to the pre-driver circuit 312 when the controller 311 or 311' is in the abnormal state, this is not limitative of the present invention. As another example, the normality or abnormality of the controller 311 or 311' may be identified depending on the magnitude of the PWM signal 315.

DESCRIPTION OF REFERENCE CHARACTERS

10 Parking brake
12 Parking brake switch
31 Power control unit (PCU)
311, 311' Controller
312 Pre-driver circuit
313 Electric power converter (inverter)
314 Distribution circuit
315 Three-phase PWM signal
316 Gate signal
317 Parking brake condition "a" signal
318 Parking brake condition "b" signal
31G, 311G Gate circuit

The invention claimed is:
1. An electric driving wheel type work vehicle comprising:
   a traveling motor;
   an inverter which drives the motor;
   a pre-driver circuit to supply a gate signal to the inverter based on a PWM signal;
   a controller which outputs the PWM signal to the pre-driver circuit to control the driving of the motor;
   a parking brake;
   a parking brake condition detection means that detects a condition of the parking brake;
   a distribution circuit that outputs a first parking brake condition signal in accordance with the parking brake condition that has been output from the parking brake condition detection means, the distribution circuit further outputting a second parking brake condition signal having a predetermined delay time relative to the first parking brake condition signal;

wherein the pre-driver circuit includes a gate signal generation means that outputs the gate signal for controlling, on the basis of the input PWM signal, up-down arm switching elements constituting the inverter, and an inhibit terminal included in the gate signal generation means, the inhibit terminal cuts off the output of the gate signal from the gate signal generation means; and wherein, when the second parking brake condition signal is input to the inhibit terminal and the parking brake condition detection means detects the parking brake has been operated, the inhibit terminal cuts off the output of the gate signal from the gate signal generation means.

2. An electric driving wheel type work vehicle comprising:
- a traveling motor;
- an inverter which drives the motor;
- a pre-driver circuit to supply a gate signal to the inverter based on a PWM signal;
- a controller which outputs the PWM signal to the pre-driver circuit to control the driving of the motor;
- a parking brake;
- a parking brake condition detection means that detects a condition of the parking brake;

wherein the pre-driver circuit includes a gate signal generation means that outputs the gate signal for controlling, on the basis of the input PWM signal, up-down arm switching elements constituting the inverter, and an inhibit terminal included in the gate signal generation means, the inhibit terminal cuts off the output of the gate signal from the gate signal generation means; and wherein, when a parking brake condition signal output from the parking brake condition detection means is input to the inhibit terminal and the parking brake condition detection means detects the parking brake has been operated, the inhibit terminal cuts off the output of the gate signal from the gate signal generation means.

* * * * *